US012691428B2

(12) United States Patent
Rath et al.

(10) Patent No.: US 12,691,428 B2
(45) Date of Patent: Jul. 28, 2026

(54) CONDITIONING SYSTEM FOR A TEST BENCH

(71) Applicant: AVL LIST GMBH, Graz (AT)

(72) Inventors: Wolfgang Rath, Bocksdorf (AT);
Vedran Burazer, Graz (AT)

(73) Assignee: AVL LIST GMBH, Graz (AT)

( * ) Notice: Subject to any disclaimer, the term of this patent is extended or adjusted under 35 U.S.C. 154(b) by 603 days.

(21) Appl. No.: 18/030,707

(22) PCT Filed: Oct. 5, 2021

(86) PCT No.: PCT/AT2021/060359
§ 371 (c)(1),
(2) Date: Apr. 6, 2023

(87) PCT Pub. No.: WO2022/073049
PCT Pub. Date: Apr. 14, 2022

(65) Prior Publication Data
US 2023/0405540 A1     Dec. 21, 2023

(30) Foreign Application Priority Data

Oct. 6, 2020     (AT) ............................... A 50852/2020

(51) Int. Cl.
*B01F 35/221*          (2022.01)
*B01F 23/45*           (2022.01)
                       (Continued)

(52) U.S. Cl.
CPC ........ *B01F 35/2215* (2022.01); *B01F 23/453* (2022.01); *B01F 25/23* (2022.01);
                       (Continued)

(58) Field of Classification Search
CPC . G01M 15/02; G01M 99/002; G05D 23/1393
See application file for complete search history.

(56) References Cited

U.S. PATENT DOCUMENTS

2019/0091641 A1     3/2019  Bonner et al.

FOREIGN PATENT DOCUMENTS

AT              10460 U2      3/2009
CN           102175351 A      9/2011
                (Continued)

*Primary Examiner* — Elizabeth Insler
(74) *Attorney, Agent, or Firm* — Dykema Gossett PLLC

(57)                   ABSTRACT
To condition an operating medium in a test object circuit (PK) of a test object (P) on a test bench to a desired temperature as quickly as possible, the invention proposes providing a mixing unit (3), there being provided, in the mixing unit (3), a mixing region (28) in which operating medium of the test object circuit (PK) can be mixed with preconditioned operating medium from a conditioning circuit (KK) in order to condition the operating medium in the test object circuit (PK) to the predefined setpoint temperature (T_SOLL), there being provided, on the mixing unit (3), for the fluidic integration of the mixing unit (3) in the test object circuit (PK), at least one test object circuit supply connection (26a) and at least one test object circuit outlet connection (26b) which are fluidically connected to one another via the mixing region (28) in order to form a part of the test object circuit (PK), there being provided, on the mixing unit (3), for connection of the mixing unit (3) to a conditioning unit (2) of the conditioning system (1), at least one conditioning unit supply connection (27a) and at least one conditioning unit return connection (27b) which are fluidically connected to one another via the mixing region (28) in order to form a part of the conditioning circuit (KK) for the operating medium.

7 Claims, 5 Drawing Sheets

(51) Int. Cl.
| | |
|---|---|
| B01F 25/23 | (2022.01) |
| B01F 25/432 | (2022.01) |
| B01F 25/452 | (2022.01) |
| B01F 33/81 | (2022.01) |
| B01F 33/82 | (2022.01) |
| G01M 15/02 | (2006.01) |
| G01M 17/00 | (2006.01) |
| G01M 99/00 | (2011.01) |
| G05D 23/13 | (2006.01) |

(52) U.S. Cl.
CPC ........ B01F 25/432 (2022.01); B01F 25/4523 (2022.01); B01F 33/811 (2022.01); B01F 33/821 (2022.01); G01M 15/02 (2013.01); G01M 17/00 (2013.01); G01M 99/002 (2013.01); G05D 23/1393 (2013.01)

(56) References Cited

FOREIGN PATENT DOCUMENTS

| | | | |
|---|---|---|---|
| DE | 102009013449 A1 | 9/2010 | |
| DE | 102015201242 A1 | 7/2016 | |
| DE | 102017105850 A1 | 7/2017 | |
| EP | 3293504 A1 | 3/2018 | |
| JP | 2013105359 A | 5/2013 | |
| JP | 2020058980 A | 4/2020 | |
| JP | 2020160730 A | 10/2020 | |
| WO | 2019149792 A1 | 8/2019 | |
| WO | WO-2019183658 A1 * | 10/2019 | ............. G01F 15/02 |

* cited by examiner

CONDITIONING SYSTEM FOR A TEST BENCH

CROSS-REFERENCE TO RELATED APPLICATION

This application is a national stage filing based upon International application No. PCT/AT2021/060359, filed 5 Oct. 2021, which claims the benefit of priority to Austria application No. A 50852/2020, filed 6 Oct. 2020.

FIELD OF THE INVENTION

The invention relates to a mixing unit for a conditioning system of a test bench for conditioning an operating medium of a test object circuit of a test object mounted on the test bench to a predefined setpoint temperature and a conditioning unit for a conditioning system of a test bench for conditioning an operating medium of a test object circuit of a test object mounted on the test bench to a predefined setpoint temperature. Furthermore, the invention relates to a conditioning system for a test bench for conditioning an operating medium of a test object circuit of a test object mounted on the test bench to a predefined setpoint temperature and a test bench with a test object and a conditioning system for conditioning an operating medium of a test object circuit of the test object to a predefined setpoint temperature. In addition, the invention relates to a method for conditioning an operating medium of a test object circuit of a test object on a test bench to a predefined setpoint temperature.

BACKGROUND

It is known that on test benches, conditioning systems can be used for certain test experiments to condition certain liquid or gaseous operating media of a mounted test object to a desired temperature. For example, whole vehicles, subsystems of vehicles or individual components of vehicles are tested as test objects. A subsystem of a vehicle is, for example, a drivetrain which can comprise one or more components, such as drive units, transmissions, etc. A component can be, for example, a drive unit such as, for example, an internal combustion engine, electric motors, combinations of internal combustion engines and electric motors (so-called hybrid drives). However, components may also be fuel cells, batteries, transmissions, etc. Each test object usually has at least one test object circuit for an operating medium, such as a coolant, fuel, lubricating oil, etc. During operation of the test object on the test bench, the operating medium circulates in the test object circuit, wherein a heat input into the operating medium usually takes place. It is often desirable to set certain temporal temperature profiles of the operating medium in the test object circuit on the test bench as precisely as possible and as quickly as possible. For example, it may be desirable to simulate a temperature profile of an operating medium of the test object on the test bench, which was previously recorded under real conditions (for example in a real vehicle during travel on a specific route) or also a simultaneously simulated temperature profile. It may also be desirable to keep the temperature at a level that is as constant as possible. Rapid temperature changes of the operating medium on the test bench by means of a conditioning system in particular can, however, at the moment only be controlled insufficiently, which is essentially due to the relatively high thermal inertia of the operating media used.

Conditioning systems are known, for example, from WO 2019/183658 A1, WO 2019/149792 A1 or EP 3 293 504 A1.

SUMMARY OF THE INVENTION

It is therefore the object of the invention to provide a device and a method which enable an operating medium in a test object circuit of a test object on a test bench to be conditioned as quickly as possible to a desired temperature.

According to the invention, the object is achieved by a mixing unit, in that a mixing region is provided in the mixing unit, in which mixing region the operating medium of the test object circuit is miscible with preconditioned operating medium from a conditioning circuit in order to condition the operating medium in the test object circuit to the predefined setpoint temperature, wherein on the mixing unit, for the fluidic integration of the mixing unit into the test object circuit, there is at least one test object circuit supply connection and one test object circuit outlet connection provided that are fluidically connected via the mixing region in order to form a part of the test object circuit, wherein at least one conditioning unit supply connection and at least one conditioning unit return connection are provided on the mixing unit for connecting the mixing unit to a conditioning unit of the conditioning system, which connections are fluidically connected to one another via the mixing region in order to form a part of the conditioning circuit for the operating medium. As a result, a very homogeneous mixture can be produced and a pressure loss in the test object circuit can be kept as low as possible.

The object is further achieved by a conditioning unit in that, on the conditioning unit, at least one mixing unit supply connection and at least one mixing unit outlet connection for connecting the conditioning unit to a mixing unit that can be fluidically integrated in the test object circuit are provided, wherein the at least one mixing unit supply connection and the at least one mixing unit outlet connection are fluidically connected within the conditioning unit in order to form a part of a conditioning circuit for the operating medium, wherein a main flow line of the conditioning circuit connected to the at least one mixing unit supply connection is divided into at least two partial flow lines in the conditioning unit, wherein each partial flow line is connected to the at least one mixing unit outlet connection, wherein the operating medium is able to be conditioned in a partial flow line to a predefined conditioning temperature, and the at least one further partial flow line can be flowed through by unconditioned operating medium having a higher or lower neutral temperature relative to the conditioning temperature, wherein a flow rate of the operating medium in the at least two partial flow lines can be adjusted as a function of the predefined setpoint temperature in the test object circuit. By adjusting the flow rate, a certain mixing ratio of operating medium from the at least two partial flow lines can be generated as a function of the predefined setpoint temperature, so that the setpoint temperature can be achieved as quickly as possible.

Furthermore, the object is achieved by a method in that a mixing unit is fluidically integrated into the test object circuit in order to form a part of the test object circuit, wherein operating medium to be conditioned is supplied to the test object circuit of the mixing unit via at least one test object circuit supply connection, and operating medium conditioned to the predefined setpoint temperature is discharged via at least one test object circuit outlet connection from the mixing unit, wherein the mixing unit is supplied via at least one conditioning unit supply connection with at least operating medium with a predefined conditioning temperature and operating medium with a neutral temperature higher or lower relative thereto, which is mixed in a mixing region provided within the mixing unit with the supplied operating medium of the test object circuit and discharged from the mixing unit via at least one conditioning unit return connection, wherein a flow rate of the operating medium with the conditioning temperature and a flow rate of the operating medium with the neutral temperature is adjusted as a function of the predefined setpoint temperature.

BRIEF DESCRIPTION OF THE DRAWINGS

The present invention is described below in greater detail with reference to FIGS. 1a to 7, which show schematic and non-limiting advantageous embodiments of the invention by way of example. The following are shown.

DETAILED DESCRIPTION

Figure 1A:
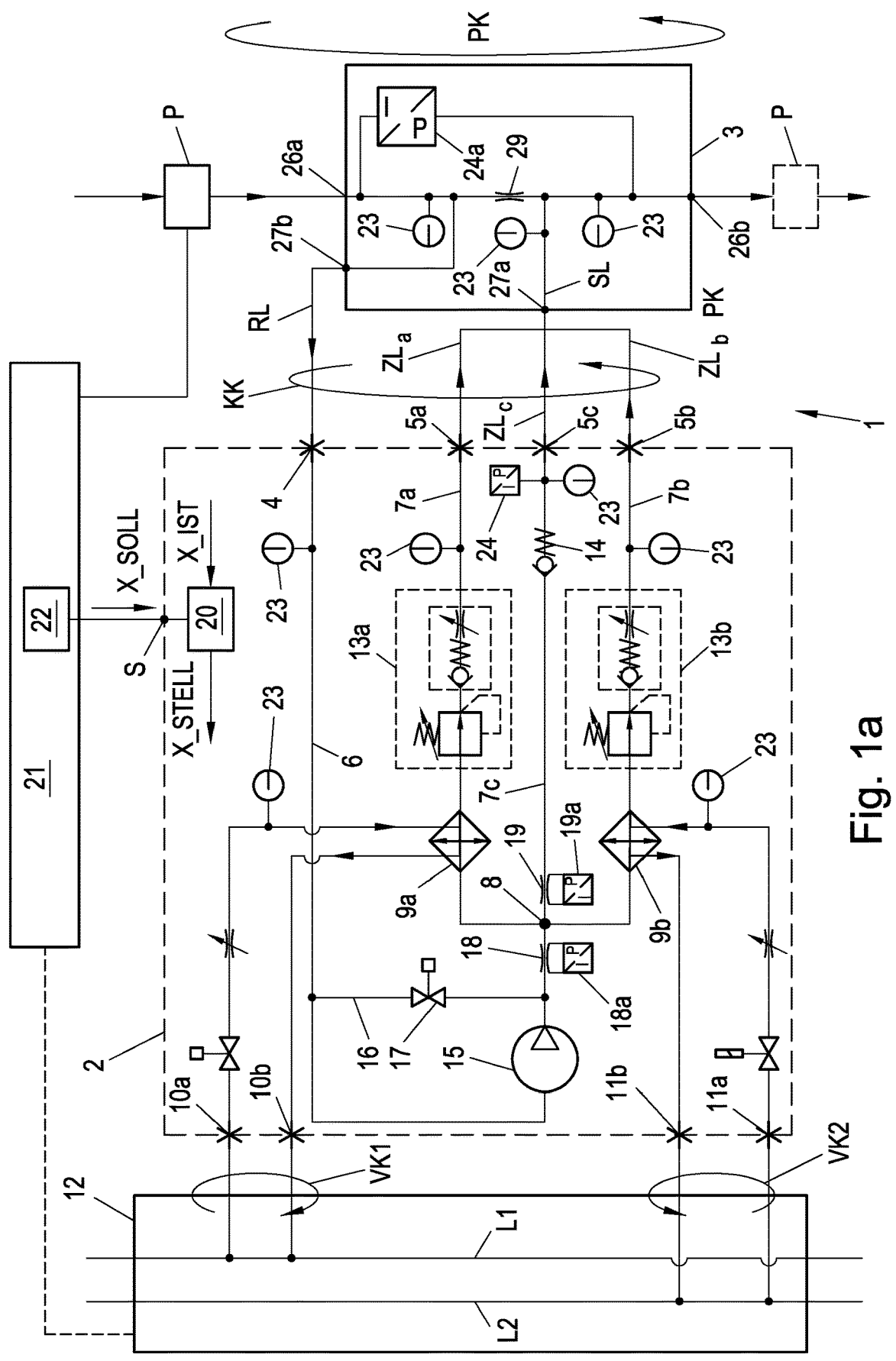
FIG. 1 shows a conditioning system of the invention in an advantageous embodiment.
FIG. 1b shows a conditioning system of the invention in an alternative embodiment

FIG. 1a shows a schematic representation of a conditioning system 1 according to the invention on a test bench in an advantageous embodiment. The conditioning system 1 has a conditioning unit 2 and a mixing unit 3, which are fluidically connected to one another in order to form a conditioning circuit KK for a fluid operating medium. A fluid operating medium is understood here to mean a suitable gaseous or liquid medium. For example, a coolant, a fuel, an oil, air, etc. can be provided as operating medium. Within the scope of the invention, "fluidically connected" is understood to mean a fluid-mechanical connection, for example via suitable pipes, lines, etc. The mixing unit 3 can be fluidically integrated into a test object circuit PK of a test object P mounted on a test bench, in which the same operating medium circulates. The type of operating medium used in the conditioning circuit KK depends on the operating medium used in the test object circuit PK of the test object P. As mentioned at the outset, as the test object P, for example, a transmission, such as a manual transmission, automatic transmission or an axle transmission, a drive unit such as, for example, an internal combustion engine, an electric motor, a hybrid drive, an energy store such as a battery or an energy converter such as a fuel cell, etc. can be provided. However, it is irrelevant for the invention which type of test object P is used. In principle, each test object P can be used with a test object circuit PK with operating medium. In the case of a plurality of operating media of the test object, a plurality of such conditioning systems 1 according to the invention can of course also be provided on the test bench. In order to control the test object P on the test bench according to a test, a test bench control unit 21 is generally provided in a known manner.

Of course, a pump (not shown) for conveying the operating medium can also be provided in the test object circuit PK, which can be part of the test bench or also part of the test object P. Of course, further components, such as heat exchangers, valves, sensors, throttles, etc., can also be provided in the test object circuit PK, which are, however, irrelevant for the invention. The mixing unit 3 can, as shown in FIG. 1, be integrated downstream of the test object P in the direction of flow of the operating medium in the test object circuit PK. However, the mixing unit 3 can also be provided upstream of the test object P in the flow direction of the operating medium, as indicated in FIG. 1 by the dashed test object P.

The temperature behavior of the operating medium is to be simulated on the test bench with the aid of the conditioning system 1. In particular, the conditioning system 1 according to the invention is intended to simulate the heat input of the test object P into the test object circuit PK, which results from the operation of the test object P. For this purpose, the test object P can actually be operated as intended on the test bench so that it itself performs work by means of which the operating medium is heated in the test object circuit PK. The conditioning system 1 could, for example, be used to simulate a higher or lower heat input of the test object P. However, the test object P can also be used only to be able to map the pressure loss caused by the test object P in the test object circuit PK as close to reality as possible. In this case, the test object P is not operated itself, thus does not cause heat input into the operating medium of the test object circuit PK, but rather its heat input is emulated by the conditioning system 1 according to the invention.

To this end, pre-conditioned operating medium from the conditioning circuit KK and the operating medium of the test object circuit PK are mixed in the mixing unit 3 in such a way that a predefined setpoint temperature T_SOLL of the operating medium is set in the test object circuit PK downstream of the mixing unit 3. The preconditioning of the operating medium in the conditioning circuit KK is carried out by the conditioning unit 2, as will be explained in more detail below. Advantageous embodiments of the mixing unit 3 are described in more detail with reference to FIGS. 2, 3 and 4.

In general, at least one mixing unit supply connection 4 and at least one mixing unit outlet connection 5 for connecting the conditioning unit 2 to the mixing unit 3 are provided on the conditioning unit 2. In the example shown according to FIG. 1a, three mixing unit outlet connections 5a-5c are provided, for example. The mixing unit supply connection 4 is fluidically connected to the three mixing unit outlet connections 5a-5c within the conditioning unit 2 in order to form a part of the conditioning circuit KK for the operating medium. In general, a main flow line 6 of the conditioning circuit KK connected to the mixing unit supply connection 4 is divided into at least two partial flow lines 7a+7c (or 7b+7c) within the conditioning unit 2, for example at a distributor node 8.

In general, the operating medium can be conditioned in one of the at least two partial flow lines 7a, 7b to a predefined conditioning temperature T1, T2, and the at least one further partial flow line 7c can be flowed through by unconditioned operating medium with a neutral temperature T3 higher or lower relative to the conditioning temperature T1, T2. The embodiment with a conditioning temperature T1 higher than the neutral temperature T3 can be used if only heating of the operating medium in the test object circuit PK is desired. The embodiment with a lower conditioning temperature T2 compared to the neutral temperature T3 may be used when cooling the operating medium in the test object circuit PK is desired. For conditioning to the conditioning temperature T1, T2 higher or lower relative to the neutral temperature T3, a suitable temperature control unit 9a, 9b can be provided in the respective partial flow line 7a, 7b, as will be explained in more detail below.

In the example shown in FIG. 1a, the main flow line 6 is divided into three partial flow lines 7a, 7b, 7c within the conditioning unit 2, a heating of the operating medium in the first partial flow line 7a, and cooling of the operating medium in the second partial flow line 7b can thus take place. In the main flow line 6, a preferably controllable or adjustable pump 15 for conveying the operating medium in the conditioning circuit KK can be provided, but a pump (not shown) can also be provided in the partial flow lines 7a-7c. Furthermore, a bypass line 16 for the operating medium can also be provided, which connects the main flow line 6 upstream of the pump 15 to the main flow line 6 downstream of the pump in order to bypass the pump 15. A controllable valve 17 can be provided in the bypass line 16 in order to reduce, preferably completely compensate, a pressure loss Δp caused by the mixing unit 3 in the test object circuit PK, as will be explained in more detail below with reference to the mixing unit 3 shown in FIG. 2-FIG. 4. Alternatively or in addition to the bypass line 16 including the valve 17, a throttle point 29 with an adjustable orifice in the mixing unit 3 can also be provided, via which the pressure loss can be compensated, as is also explained in more detail with reference to FIG. 2 to FIG. 4.

In the example according to FIG. 1a, each partial flow line 7a-7c is connected within the conditioning unit 2 to a mixing unit outlet connection 5a-5c in each case. The mixing unit outlet connections 5a-5c can in turn be connected, for example, via supply lines ZLa-Zlc to the mixing unit 3 in order to supply the preconditioned operating medium to the mixing unit 3. The operating medium can be conditioned in a first partial flow line 7a to a first conditioning temperature T1 and conditioned in a second partial flow line 7b to a second conditioning temperature T2. A third partial flow line 7c can be flowed through by the operating medium with a neutral temperature T3 between the first and second temperatures T1, T2 and is preferably not conditioned separately. The temperature ranges of the conditioning temperatures T1, T2 depend essentially on the predefined boundary conditions or requirements on the conditioning system 1, such as, for example, a minimum or maximum required setpoint temperature T_SOLL of the operating medium and/or the operating medium used. The neutral temperature T3 between the conditioning temperatures T1, T2 depends essentially on the temperature of the operating medium flowing back from the mixing unit 3.

At least one first temperature control unit 9a is preferably provided in the conditioning unit 2 in the first partial flow line 7a in order to condition the operating medium to the first (high) conditioning temperature T1. Likewise, at least one second temperature control unit 9b is preferably provided in the second partial flow line 7b in order to condition the operating medium to the second (low) conditioning temperature T2. In principle, all devices which are suitable for conditioning the operating medium in the first and second partial flow lines 7a, 7b to the respectively provided conditioning temperatures T1, T2, such as, for example, heat exchangers, (e.g., electric) heating devices, cooling devices, heat pumps, Peltier elements, etc. can be used as the temperature control unit 9a, 9b. For example, a heat source supply connection 10a and at least one heat source return connection 10b for connecting a heat source may be provided on the conditioning unit 2 for this purpose. The heat source supply connection 10a and the heat source return connection 10b can be fluidically connected to the first temperature control unit 9a designed as a heat exchanger in order to form a part of a heat source supply circuit VK1.

In an analogous manner, at least one heat sink supply connection 11a and at least one heat sink return connection 11b can also be provided on the conditioning unit 2 for connecting the heat sink, which are fluidically connected to the second temperature control unit 9b designed as a heat exchanger to form part of a heat sink supply circuit VK2. Any suitable device with which the supply medium of the heat source supply circuit VK1 is kept at a relatively high supply temperature as constant as possible, for example in the range of 10 K above the maximum required setpoint temperature, can be used as a heat source. Analogously, any suitable device can be used as a heat sink, with which the supply medium of the heat sink supply circuit VK2 is kept at a relatively low supply temperature as constant as possible, for example in the range of 10 K below the required setpoint temperature. For example, the operating medium or another suitable medium can be used as the supply medium.

The provision of heat by the heat source and heat sink can take place, for example, in a separate supply module 12, which forms an independent unit to which the conditioning unit 2 can be connected. Of course, further hydraulic components (not shown) for the supply circuits VK1, VK2 can also be provided in the supply module 12, for example pumps, pressure control devices, valves, tanks, etc. The control of the supply module 12 could be carried out, for example, by a conditioning unit control unit 20 which can be arranged, for example, in the conditioning unit 2. However, the control of the supply module 12 could also take place, for example, by a test bench control unit 21 of the test bench on which the conditioning system 1 is used (as indicated by the dashed connecting line in FIG. 1).

Often, however, a central media supply system, for example as part of the test bench building, is provided on test benches for providing preconditioned supply media. By way of example, several, also different types of test benches can be supplied with one or more preconditioned supply media via the central media supply system. The provision of the preconditioned supply media for the supply circuits VK1, VK2 of the first and second temperature control units 9a, 9b, in particular heat exchangers, could take place in this case, for example, via supply lines L1, L2 of the central media supply system, as indicated in FIG. 1a. A separate supply module 12 can be dispensed with in this case.

The conditioning unit 2 is designed to control, in particular to regulate, a flow of the operating medium, e.g. volume flow or mass flow, in the three partial flow lines 7a-7c (or generally at least two partial flow lines 7a+7c or 7b+7c) as a function of the predefined setpoint temperature T_SOLL of the operating medium in the test object circuit PK, so that the setpoint temperature T_SOLL in the test object circuit PK can be set as quickly as possible. For this purpose, the pre-conditioned operating medium from the partial flow lines 7a-7c of the conditioning unit 2 is mixed with the operating medium in the test object circuit PK as a function of the predefined setpoint temperature T_SOLL of the test object circuit PK, wherein the mixing takes place in the mixing unit 3, in particular in a mixing region 28 of the mixing unit 3, as will be explained in more detail below with reference to FIG. 2-FIG. 4. In order to form the conditioning circuit KK, the conditioning unit 2 can be connected, for example, via one or more suitable supply lines ZLa-ZLc and one or more suitable return lines RL to the mixing unit 3.

To this end, at least one conditioning unit supply connection 27a and a conditioning unit return connection 27b are provided on the mixing unit 3. The conditioning unit return connection 27b can be connected via the return line RL to the mixing unit supply connection 4 of the conditioning unit 2. In the example shown in FIG. 1a, a supply line ZLa-ZLc is connected to each mixing unit outlet connection 5a-5c of the conditioning unit 2. If a single conditioning unit supply connection 27a is provided on the mixing unit 3, the supply lines ZLa-ZLc can preferably be combined directly before the mixing unit 3 to form a common collecting line SL, as is indicated in FIG. 1a. The common collecting line SL can then be connected to the conditioning unit supply connection 27a. However, a plurality of conditioning unit supply connections 27a (not shown) could also be provided on the mixing unit 3, for example three conditioning unit supply connections 27a (or one conditioning unit supply connection 27a per supply line ZLa-ZLc). In this case, each mixing unit outlet connection 5a-5c could be connected via a supply line ZLa-ZLc to a conditioning unit supply connection. The plurality of conditioning unit supply connections 27a could then be combined in the mixing unit 3 to form a collecting line SL, which in turn opens into the mixing region 28 of the mixing unit 3. In order to rapidly reach the desired setpoint temperature T_SOLL in the test object circuit PK, it is advantageous if the preconditioned operating medium is not combined to one flow in the collecting line SL until as close as possible to the mixing unit 3, preferably not until directly inside the mixing unit 3.

The flows in the three partial flow lines 7a-7c of the conditioning unit 2 (or generally at least two partial flow lines 7a+7c or 7b+7c) can be established as a function of the setpoint temperature T_SOLL to be achieved in such a way that a preconditioned mixture of operating medium of the first conditioning temperature T1 or operating medium of the second conditioning temperature T2 and operating medium of the intermediate neutral temperature T3 with a certain mixing ratio is formed in the conditioning circuit KK, so that, when this preconditioned mixture of the operating medium from the conditioning circuit KK is mixed with the operating medium of the test object circuit PK, the predefined setpoint temperature T_SOLL is set as quickly as possible in the test object circuit PK. The conditioning temperatures T1, T2 and the neutral temperature T3 of the operating medium in the partial flow lines 7a, 7c are substantially constant and the setpoint temperature T_SOLL is substantially only set via the control or regulation of the flows in the partial flow lines 7a-7c of the conditioning unit 2, so that a certain mixing ratio is achieved. If only two partial flow lines (warm+neutral or cold+neutral) are provided, only these two partial flows are, of course, mixed with a certain mixing ratio, so that the setpoint temperature T_SOLL is set in the test object circuit PK. The flow ratio in the conditioning circuit KK is preferably higher than the flow ratio in the test object circuit PK, so that the operating medium in the test object circuit PK is preferably replaced substantially completely by the preconditioned operating medium from the conditioning circuit KK.

To control the flow ratios, a known pressure control unit 13a, 13b can be provided, for example, in the first partial flow line 7a and in the second partial flow line 7b of the conditioning circuit KK of the conditioning unit 2, and a check valve 14 can be provided in the third partial flow line 7c. In the main flow line 6, for example upstream of the distributor node 8, a first measuring orifice 18 can be provided with a differential pressure sensor 18a for measuring a differential pressure Δp1 over the first measuring orifice 18 and, in the third partial flow line 7c, for example, downstream of the distributor node 8, a second measuring orifice 19 can be provided with a differential pressure sensor 19a for measuring a differential pressure Δp2 over the second measuring orifice 19. Since the differential pressures Δp1, Δp2 are proportional to the square of the respective flow rate (volumetric flow rate, mass flow rate), the percentage flow rates (=partial volumetric flow rates, partial mass flow rates) can be calculated from the difference between the measured differential pressures Δp1, Δp2 in the partial flow lines 7a-7c. At a difference of Δp1–Δp2=0, for example, 100% of the operating medium flow via the third partial flow line 7c, at a difference Δp1–Δp2=0.5×Δp1, for example 75% of the operating medium flow via the third partial flow line 7c and 25% via the first or the second partial flow line 7a, 7b (or generally via the at least one partial flow line 7a or 7b), etc. Alternatively, a suitable flow measuring unit (not shown) can also be provided instead of the measuring orifice 18 with a differential pressure sensor 18a and instead of the measuring orifice 19 with a differential pressure sensor 19a, by means of which flow measuring unit the flow rate (volume flow rate, mass flow rate) can be measured directly, for example in the form of a known MID sensor (magnetic-inductive flow meter) or a Coriolis mass flow meter.

The conditioning system 1 can be controlled, for example, via a suitable control unit in the form of hardware (micro-processor-based hardware, integrated circuit (such as an ASIC, FPGA), programmable logic controller, analog circuit, or a combination of such hardware) and/or software. For example, the control could be carried out directly via a superordinate control unit, such as, for example, the test bench control unit 21 of the test bench, which is usually present on each test bench anyway. The test bench control unit 21 usually controls or regulates the test object P and any further devices of the test bench, for example a load machine (not shown) for driving or for loading the test object P and/or a supply module 12, etc. Alternatively, or additionally, a conditioning unit control unit 20 could also be provided in the conditioning unit 2. The test bench control unit 21 could then suitably communicate with the conditioning unit control unit 20 to exchange control information. For example, the test bench control unit 21 could be connected to the conditioning unit 2 via a suitable test bench interface S, via which control data can be transmitted or exchanged.

In the test bench control unit 21 and/or the conditioning unit control unit 20, one or more suitable controllers, for example PID controllers, can be provided in order to adjust a predefined setpoint variable X_IST In the test object circuit PK, in particular the setpoint temperature T_SOLL. Optionally, however, a setpoint pressure loss Δp_SOLL can also be controlled via the mixing unit 3, in particular in order to be able to compensate for the design-related pressure loss of the mixing unit 3 or to simulate different pressure losses. In the control, a known pilot control (feed-forward control) can advantageously also be implemented, so that the controller must only compensate for smaller errors. The setpoint values X_SOLL of the control can be specified, for example, via the test bench control unit 21. For example, a simulation unit 22 can also be provided in the test bench control unit 21, in which a simulation model is implemented. By means of the simulation model 22, a specific time profile of a setpoint value X_SOLL, in particular a time profile of a setpoint temperature T_SOLL, can be generated, for example. However, it could also be possible, for example, to use a measured temporal temperature profile as the setpoint temperature T_SOLL, which originates, for example, from a real measurement run with a vehicle, for example from a vehicle in which the test object P to be examined was installed or from test bench tests already carried out with the test object P, etc.

Figure 1B:
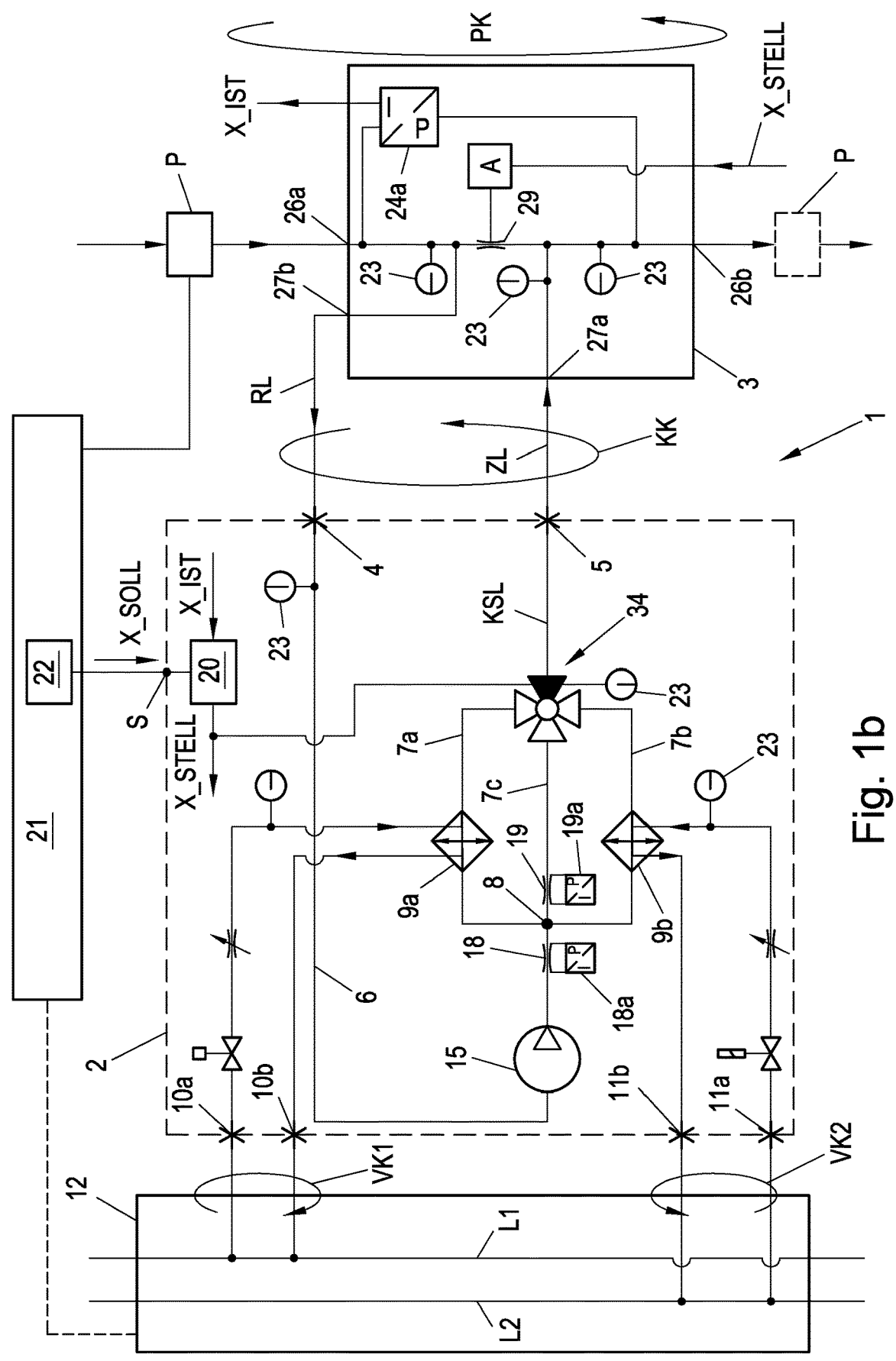

In the simplest case, a constant setpoint value X_SOLL, e.g., a constant setpoint temperature T_SOLL and/or a constant pressure loss Δp_SOLL, could of course also be specified, for example by manual input via a suitable input unit such as a computer. By way of example, the setpoint values X_SOLL can be transferred by the test bench control unit 21 via the test bench interface S to the conditioning unit control unit 20 and processed by the latter. From the predefined setpoint value(s) X_SOLL and the captured actual values X_IST, the conditioning unit control unit 20, for example the controller implemented therein, determines the required control input variables X_STELL of the control elements required for the control, for example the pressure control units 13a, 13b (FIG. 1a) and/or the pump 15 and/or the controllable valve 17 in the bypass line 16 and/or a valve unit 34 (FIG. 1b) to be explained in more detail in the following and/or an control element A of an adjustable orifice of the throttle point 29 (FIG. 1b).

Actual values X_IST of the control can be measured during the operation of the conditioning system 1 by suitable sensors, for example on the conditioning unit 2 and the mixing unit 3, and transmitted to the conditioning unit control unit 20. In the conditioning unit 2 and the mixing unit 3, for example, one or more temperature sensors 23, pressure sensors 24 and differential pressure sensors 24a, 18a, 19a can be provided, with which an actual temperature T_IST, an actual pressure p_IST or an actual differential pressure Δp_IST of the operating medium (or the supply medium of the temperature control units 9a, 9b designed as heat exchangers) can be determined. In the mixing unit 3, for example, a differential pressure sensor 24a can be provided in order to measure the pressure loss Δp_IST via the mixing unit 3. A differential pressure sensor 24a can, of course, also be understood to mean two individual pressure sensors 24 which each generate a measured value. The pressure loss Δp_IST can then be determined from the difference between the measured values of the pressure sensors 24. The same naturally also applies analogously to the differential pressure sensors 18a, 19a.

For example, the mentioned pressure control units 13a, 13b of the first and second partial flow line 7a, 7b can be provided as control elements for controlling the temperature in the operating medium of the test object circuit PK. Via the pressure control units 13a, 13b, the flow in the at least two partial flow lines 7a+7c or 7b+7c can be adjusted as a function of the setpoint temperature T_SOLL. The control unit 21, 20 can, for example, calculate a setpoint differential pressure Δp2_SOLL in the third partial flow line 7c on the basis of the general Richmann's law of mixtures according to the relationship $$\Delta P2\_SOLL = \Delta p1 * \frac{(T\_SOLL - T3)}{(Tx - T3)^2}.$$

In this case, Δp1 is the differential pressure measured by means of the measuring orifice 18 in the main flow line 6 before the junction 8, T_SOLL is the desired setpoint temperature of the operating medium, T3 is the neutral temperature of the operating medium in the third partial flow line 7c and Tx is representative of the conditioning temperature T1 or T2 of the operating medium in the first or second partial flow line 7a, 7b. From the setpoint differential pressure Δp2_SOLL and the actual differential pressure Δp2_IST measured by means of measuring orifice 19, the control unit 20, 21 can determine a control input variable X_STELL with a suitable controller, for example a PI or PID controller, with which the pressure control units 13a, 13b are controlled. If, instead of the measuring apertures 18, 19 with differential pressure sensors 18a, 19a, suitable flow measuring devices for measuring the mass flow or volume flow are used, for example, Richmann's law of mixtures could of course also be used in an analogous manner to calculate a setpoint mass flow or a setpoint volume flow.

However, the above relationship can also be used for example to determine an actual temperature T_IST of the mixed operating medium, that is to say, for example, in the region of the collecting line SL in the mixing unit 3, on which the temperature sensor 23 is shown in FIG. 1a. This can be advantageous in particular in the dynamic operation of the conditioning system 1, in which, for example, a temporally variable temperature profile of the setpoint temperature T_SOLL in the test object circuit PK is to be set, because the temperature sensor 23 may not be able to measure rapid temperature changes quickly enough. The actual temperature T_IST of the mixture can be calculated, for example, using the general Richmann's law of mixtures according to $$T\_IST = \frac{(mx * Tx + m3 * T3)}{mx + m3}.$$

In this case, mx stands for the mass flow rate m1, m2 of the operating medium in the first or second partial flow line 7a, 7b, tx stands for the conditioning temperature T1, T2 in the first or second partial flow line 7a, 7b, m3 stands for the mass flow rate in the third partial flow line 7c and T3 stands for the neutral temperature in the third partial flow line 7c. The prerequisite for this is that the mass flow rates mx, m3 are known. For this purpose, for example, suitable flow measuring devices for measuring the mass flow rate mx, m3 instead of the measuring orifices 18, 19 can be used. If suitable flow measuring devices for measuring the volume flow rate are provided instead of the measuring orifice 18, 19, the volume flow rates could of course also be used for calculation.

For the flow measurement by means of the measuring apertures 18, 19 shown in FIG. 1a (and also in FIG. 1b) with differential pressure sensors 18a, 19a, the following relationship is obtained:

$$T\_IST = \sqrt{\frac{\Delta p2}{\Delta p1}} * (Tx - T3) + T3.$$

For example, the controllable valve 17 in the bypass line 16 of the pump 15 can be used as control elements for controlling or compensating for the pressure loss in the mixing unit 3. Alternatively, or in addition to the control via the valve 17, the pressure loss compensation can also be carried out by varying the delivery capacity of the pump 15 (e.g. by varying a pump speed). Furthermore, an adjustable orifice could also be provided in the mixing unit 3 for controlling the pressure loss (FIG. 1b). As a function of the predefined setpoint values X_SOLL, the conditioning unit control unit 20 can calculate corresponding control input variables X_STELL and adjust them via the control elements.

Another embodiment of a conditioning system 1 is shown in FIG. 1b. The structure and function of the conditioning system 1 substantially correspond to the conditioning system 1 from FIG. 1a, for which reason only the essential differences will be discussed below. In contrast to FIG. 1a, only one mixing unit outlet connection 5 is provided on the conditioning unit 2. The partial flow lines 7a-7c (or generally the at least two partial flow lines 7a+7c or 7b+7c) are therefore already combined into a conditioning unit collecting line KSL within the conditioning unit 2, which is connected to the mixing unit outlet connection 5. Consequently, of course, only a single supply line ZL is required to connect the mixing unit 3 to the conditioning unit 2. As a result, fewer lines are required, as a result of which a simpler connection is possible.

In the conditioning unit 2, a valve unit 34 for mixing the operating medium from the three partial flow lines 7a-7c (or generally at least two partial flow lines 7a+7c; 7b+7c) and for supplying to the conditioning unit collecting line KSL can be provided. The partial flow lines 7a-7c are connected via the valve unit 34 to the conditioning unit collecting line KSL, and the conditioning unit collecting line KSL is in turn connected to the mixing unit outlet connection 5. Alternatively or additionally, a valve unit 34 (not shown) for distributing the operating medium from the main flow line 6 could also be provided at the junction 8 to the partial flow lines 7a-7c, wherein the main flow line 6 is connected to the partial flow lines 7a-7c via the valve unit 34. The use of a controllable valve unit 34 makes it possible to dispense with the pressure control units 13a, 13b in the partial flow lines 7a, 7b and the check valve 14 in the third partial flow line 7c, as can be seen in FIG. 1b. An advantageous embodiment of a valve unit 34 is explained in more detail below with reference to FIG. 5.

In the mixing unit 3 shown in FIG. 1b, in contrast to FIG. 1a, an adjustable orifice is provided at the throttle point 29, which can be adjusted by an electrically controllable control element A, for example a suitable actuator, in order to change the flow cross section of the throttle point 29. As a result, the bypass line 16 and the controllable valve 27 from FIG. 1a can be omitted and the pressure loss compensation can take place via the adjustment of the orifice by means of the control element A. For this purpose, a differential pressure sensor 24a for measuring a differential pressure $\Delta p$ as actual variable X_IST in the mixing unit 3 can again be provided. The actual variable X_IST can be transmitted, for example, to the test bench control unit 21 and/or to the conditioning unit control unit 20, which determines a control input variable X_STELL which is transmitted to the control element A, as indicated in FIG. 1b. If the pressure loss compensation is only effected via the orifice, a controllable pump 15 could also be dispensed with, for example, in a simple embodiment, and a pump 15 with a constant delivery capacity in the conditioning unit 2 can be used.

Figure 2:
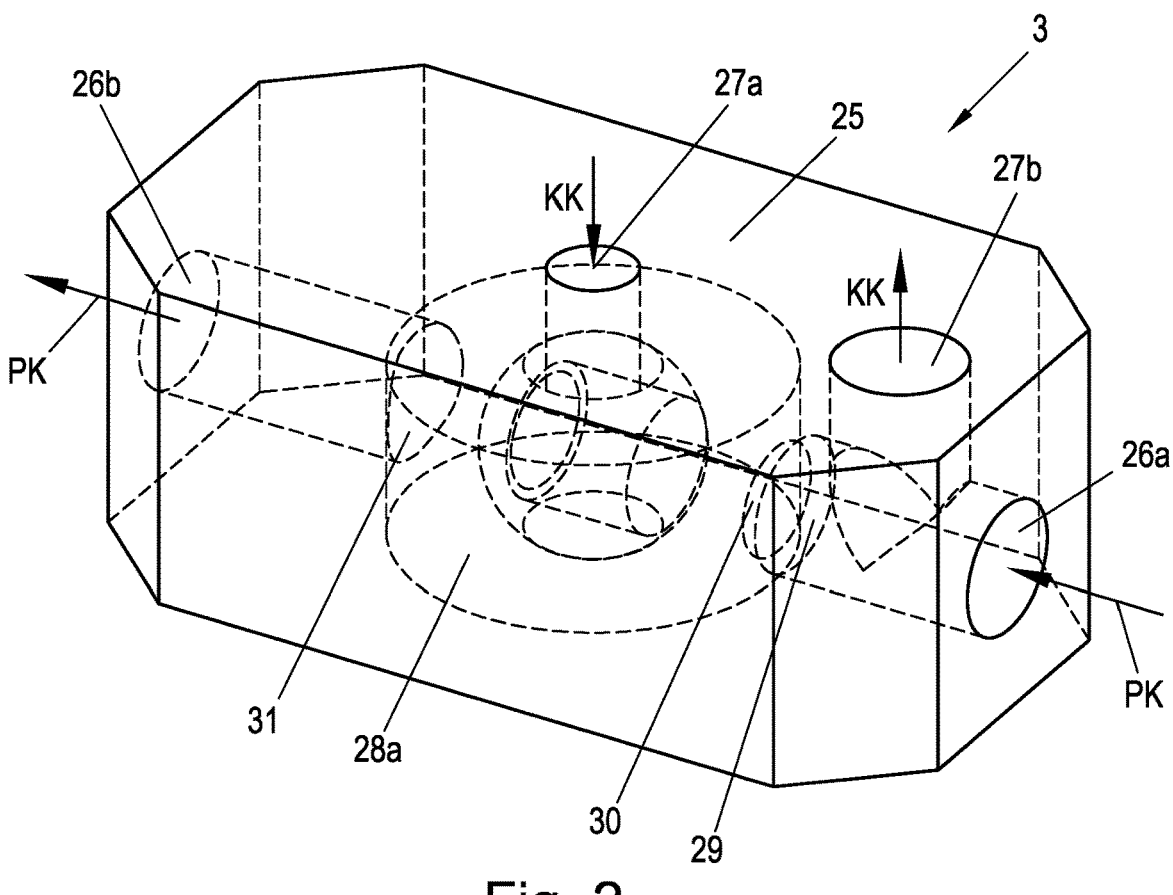
FIG. 2 shows a mixing unit according to the invention in an advantageous embodiment.
Figure 3:
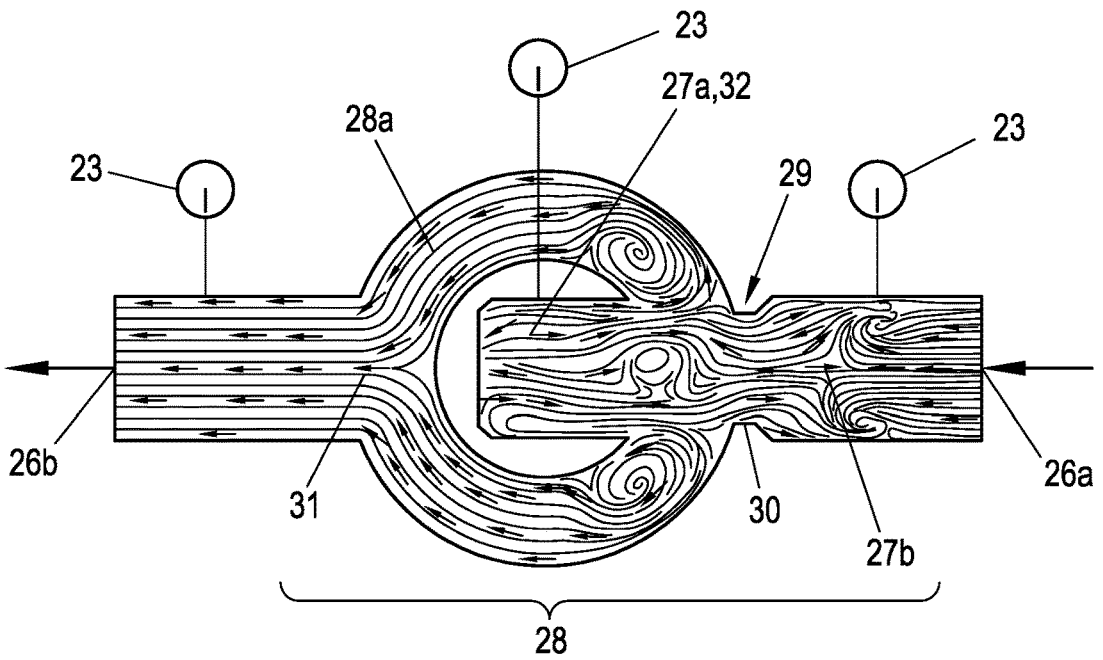
FIG. 3 shows a flow profile in the mixing chamber of the mixing unit.
Figure 4:
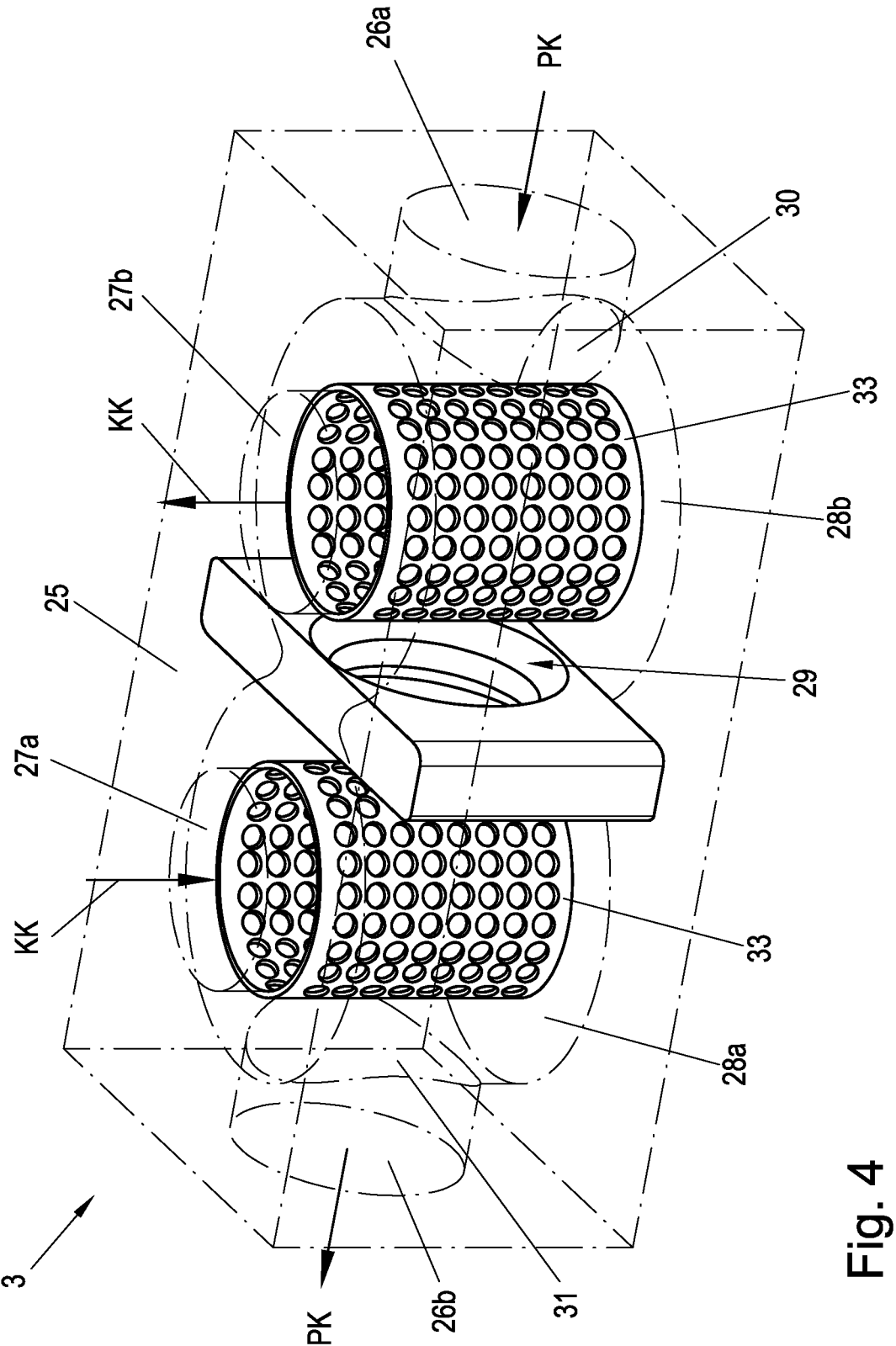
FIG. 4 shows a mixing unit according to the invention in an alternative embodiment.

The mixing unit 3 is explained in more detail below with reference to FIG. 2 to FIG. 4 by means of two advantageous embodiments. FIG. 2 shows the mixing unit 3 of a first embodiment in a perspective view and FIG. 3 shows a flow profile of the operating medium within the mixing unit 3 from FIG. 2 in plan view. FIG. 4 shows a mixing unit 3 in an alternative embodiment in a perspective view. In general, the mixing unit 3 can have a housing 25 made of a suitable material, for example of a steel or aluminum alloy or plastic, in which suitable flow channels for guiding the operating medium are provided. At least one test object circuit supply connection 26a and at least one test object circuit outlet connection 26b for fluidically integrating the mixing unit 3 into the test object circuit PK of the test object P are provided on the mixing unit 3. As a result, the mixing unit 3 can easily be integrated into an existing test object circuit PK of a test object P on the test bench without structural changes being required on the test bench.

Of course, connecting and sealing elements (not shown) can also be provided on the mixing unit 3 in order to enable the simplest possible and leakage-free connection for example of a pipeline or a hose of the test object circuit PK to the test object circuit supply connection 26a and the test object circuit outlet connection 26b of the mixing unit 3. The test object circuit supply connection 26a and the test object circuit outlet connection 26b are fluidically connected within the mixing unit 3 via the mixing region 28 to form part of the test object circuit PK. Operating medium can thus flow within the mixing unit 3 from the test object circuit supply connection 26a via the mixing region 28 to the test object circuit outlet connection 26b, as indicated in FIG. 2-FIG. 4 by the two arrows and, as can also be seen in FIG. 3, from the flow. Within the scope of the invention, the mixing region 28 is understood to mean the entire region within the mixing unit 3 in which the operating medium from the conditioning circuit KK and the operating medium are in contact with the operating medium circuit PK.

As described, at least one conditioning unit supply connection 27a and at least one conditioning unit return connection 27b for connecting the mixing unit 3 to the conditioning unit 2 of the conditioning system 1 are provided on the mixing unit 3. As mentioned, the connection can take place, for example, via a return line RL and one or more supply lines ZL, ZLa-ZLc, for example a supply line ZLi per each partial flow line (FIG. 1a) or a common supply line ZL (FIG. 1b). In the case of a plurality of supply lines ZLa-ZLc, these can be combined in front of the mixing unit 3 to form a common collecting line SL or a plurality of conditioning unit supply connections 27 a could also be provided, which can each be connected to a supply line ZLa-ZLc. The preconditioned operating medium can be combined from the partial flows to one flow in this case by a collecting line SL in the mixing unit 3.

The at least one conditioning unit supply connection 27a and the at least one conditioning unit return connection 27b are likewise fluidically connected within the mixing unit 3 via the mixing region 28 to form a part of the conditioning circuit KK (see FIGS. 1a, 1b) for the operating medium. As a result, the preconditioned operating medium which is supplied to the mixing unit 3 by the conditioning unit 2 can flow within the mixing unit 3 from the conditioning unit supply connection 27a via the mixing region 28 to the conditioning unit return connection 27b, as is indicated in FIG. 2 by the two arrows. The flow of the operating medium of the conditioning circuit KK is thus directed counter to the flow of the operating medium of the test object circuit PK, as a result of which good mixing takes place. In addition, the pressure loss in the test object circuit PK can thereby be compensated via the throttle point 29. Of course, connecting and sealing elements (not shown) can be provided on the mixing unit 3 in order to enable the most leakage-free connection for example of a pipeline or a hose of the conditioning circuit KK to the conditioning unit supply connection 27a and the conditioning unit return connection 27b of the mixing unit 3.

In the mixing unit 3, as mentioned, a mixing region 28 is provided, in which the operating medium of the test object circuit PK is miscible with the conditioned operating medium from the conditioning circuit KK in order to condition the operating medium in the test object circuit PK to the predefined setpoint temperature. In order to generate as quickly as possible a mixture as homogeneous as possible from the operating medium of the conditioning circuit KK and the operating medium of the test object circuit PK, the mixing region 28 preferably has at least one substantially annular mixing chamber 28a, as can be seen in particular in FIG. 3. In general, in the context of the invention, annular is substantially to be understood as an arbitrary ring shape, for example a cylinder ring, torus etc. The conditioning unit return connection 27b is preferably arranged on the mixing unit 3 in such a way that it opens into the mixing region 28 between the test object circuit supply connection 26a and the conditioning unit supply connection 27a.

In the example according to FIG. 2+FIG. 3, the conditioning unit return connection 27b opens, for example, between the test object circuit supply connection 26a and the annular mixing chamber 28a into the mixing region 28. In addition, a throttle point 29 can be provided between the conditioning unit supply connection 27a and the conditioning unit return connection 27b. In the example according to FIG. 2+FIG. 3, the throttling point 29 is arranged, for example, between the annular mixing chamber 28a and the conditioning unit return connection 27b and is designed as a fixed constriction with an unchangeable flow cross section. By means of the throttle point 29, a differential pressure can be generated in the flow of the operating medium between the conditioning unit supply connection 27a and the conditioning unit return connection 27b, which pressure difference counteracts the differential pressure in the flow of the operating medium in the test object circuit PK. By setting a higher flow rate (volume flow rate or mass flow rate) of the operating medium in the conditioning circuit KK relative to the flow rate (volume flow rate or mass flow rate) in the test object circuit PK (e.g., via a preferably controllable pump 15 and/or bypass line 16 with valve 17), the pressure loss generated by the mixing unit 3 in the test object circuit PK can thus be reduced or preferably compensated completely or adjusted to a certain value. In general, the flow rate (volume flow rate or mass flow rate) in the conditioning circuit KK is preferably higher than the flow rate (volume flow rate or mass flow rate) in the test object circuit PK, for example 5-20%, in particular about 10% higher. As a result, the operating medium of the test object circuit PK in the mixing unit 3 can advantageously be exchanged substantially completely and replaced by conditioned operating medium from the conditioning circuit KK. The temperature of the operating medium in the region of the at least one conditioning unit supply connection 27a (e.g. in the collecting line SL—FIG. 1a or in the supply line ZL—FIG. 1b) therefore preferably corresponds substantially to the temperature of the operating medium in the region of the test object circuit outlet connection 26b. Therefore, for example, the temperature in the region of the at least one conditioning unit supply connection 27a can also be used as the setpoint temperature T_SOLL and actual temperature T_IST within the context of the present invention.

In order to control the pressure loss compensation, according to an advantageous embodiment, the flow cross section at the throttle point 29 can also be variable (alternatively or additionally to the control of the flow rate in the conditioning circuit KK in the conditioning unit 2). As already mentioned, for this purpose, for example, an adjustable orifice can be provided, by means of which the flow cross section of the throttle point 29 can be changed. In the simplest case, the adjustable orifice could be manually adjustable, but preferably an electrically controllable control element A (see FIG. 1b) is provided for adjusting the orifice, which is controllable, for example, by the conditioning unit control unit 20 and/or by the test bench control unit 21. As mentioned, the control or regulation of the flow of the operating medium of the conditioning circuit KK can take place via a control unit (e.g. test bench control unit 21 or conditioning unit control unit 20). For example, a suitable controller (e.g. PID controller) can be implemented in the conditioning unit control unit 20 for this purpose. The controller can calculate, from the actual differential pressure Δp_IST measured by means of the differential pressure sensor 24a (FIG. 1) on mixing unit 3 in the test object circuit PK and a predefined setpoint differential pressure Δp_SOLL (e.g. Δp_SOLL=0), a control input variable X_STELL for the controllable valve 17 in the bypass line 16 of the pump 15 of the conditioning unit 2, and control the valve accordingly. As already mentioned, a known pilot control of the control input variable X_STELL can also be implemented in the control. However, the control of the flow rate could also take place via a pump 15 with a variable delivery rate, for example via a pump 15 with a controllable pump speed. The control of the adjustable orifice for adjusting the flow cross section could also be controlled, for example, via a separate control unit and/or via the test bench control unit 21 or the conditioning unit control unit 20. If the adjustable orifice is closed at the throttle point 29, the pump 15 of the conditioning unit 2 can also be used, for example, to convey the operating medium in the test object circuit PK. In this case, a separate pump could also be dispensed with in the test object circuit PK.

In order to reduce the pressure loss Δp in the test object circuit PK, it is advantageous if an inlet opening 30 of the test object circuit supply connection 26a leading from radially outside into the annular mixing chamber 28a and a outlet opening 31 of the test object circuit outlet connection 26b leading from radially outside into the annular mixing chamber 28a are spaced apart from one another in the mixing chamber 28a at a circumferential distance of at least 90°, preferably 180°±30°. Furthermore, it can be advantageous if the at least one conditioning unit supply connection 27a extends into a central region 32 of the mixing unit 3 and opens from radially inside into the annular mixing chamber 28a, preferably in the region of the inlet opening 30 of the test object circuit supply connection 26a. As has already been described with reference to FIG. 1, at least one temperature sensor 23 for measuring the actual temperature T_IST of the operating medium can be provided on the mixing unit 3. A temperature sensor 23 is preferably provided in the region of the conditioning unit supply connection 27a, a temperature sensor 23 is provided in the region of the test object circuit supply connection 26a and a temperature sensor 23 is provided in the region of the test object circuit outlet connection 26b, as is indicated in FIG. 3. The measured actual temperatures T_IST can be transmitted, for example, to a control unit (e.g., test bench control unit 21 or conditioning unit control unit 20) for adjusting the setpoint temperature T_SOLL in the test object circuit PK.

FIG. 4 shows an alternative embodiment of the mixing unit 3. At least one test object circuit supply connection 26a, at least one test object circuit outlet connection 26b, at least one conditioning unit supply connection 27a, and at least one conditioning unit return connection 27a are again provided on the mixing unit 3. In contrast to the variant according to FIG. 3, two substantially annular mixing chambers 28a, 28b are provided in the mixing region 28, which preferably communicate radially with one another. A throttle point 29 is preferably provided in the flow connection between the two annular chambers 28a, 28b. Similarly as described with reference to FIG. 3, the throttle point 29 could in turn have an invariable flow cross section or an adjustable orifice (not shown) could be provided with a control element A for adjusting the flow cross section, as indicated in FIG. 1b. The conditioning unit supply connection 27a preferably opens in the axial direction substantially centrally into the first mixing chamber 28a and the test object circuit outlet connection 26b preferably opens radially into the first mixing chamber 28a. In an analogous manner, the conditioning unit return connection 27b preferably opens in the axial direction substantially centrally into the second mixing chamber 28b and the test object circuit supply connection 26a preferably opens radially into the second mixing chamber 28b. In order to keep the pressure loss as low as possible, it is likewise advantageous here if a inlet opening 30 of the test object circuit supply connection 26a leading from radially outside into the second annular mixing chamber 28b and an outlet opening 31 of the test object circuit outlet connection 26b leading from radially outside into the first annular mixing chamber 28a are spaced apart from one another at an angle of at least 90°, preferably 180°±30°, wherein the inlet opening 30 and the outlet opening 31 are advantageously aligned, as shown.

In order to achieve the best possible mixing of the preconditioned operating medium from the conditioning circuit KK with the operating medium of the test object circuit PK, it can further be advantageous if at least one sieve element 33 is provided in the mixing region 28. As a result, turbulence can be generated in the flow which improves the mixing. In the case of a corresponding arrangement in the flow path, the at least one sieve element 33 can also serve as a kind of dirt filter, such that, for example, deposits or dirt particles from the test object circuit PK cannot enter the conditioning circuit KK. For this purpose, at least one sieve element 33 with a sufficiently small mesh width can be provided, for example, at least in the region of the conditioning unit return connection 27b. In general, different structural designs can be used as sieve elements 33, for example perforated plates, wire meshes, metal grids, etc.

As shown in FIG. 4, it is particularly advantageous if a sieve element 33, which is preferably designed in the form of a ring, is provided in the annular mixing chambers 28a, 28b. In the example shown, the sieve elements 33 are designed as substantially cylindrical sleeves, on the outer circumferential surface of which a plurality of openings are provided which connect the outer circumferential surface to the inner circumferential surface. Depending on the number, size and distribution of the openings on the circumference, the mixing and/or filter properties can be influenced. In the variant according to FIG. 4, for example, preferably cylindrical recesses can first be provided for each mixing chamber 28a, 28b, for example drilled or milled into the housing 25. Thereafter, the annular sieve elements 33 can be inserted in a suitable manner. The annular mixing chamber 28a, 28b is thus formed in each case between the inner circumferential surface of the cylindrical opening and the outer circumferential surface of the annular sieve element 33.

As a result, the preconditioned operating medium can flow from the conditioning circuit KK via the conditioning unit supply connection 27a substantially in the axial direction into the cylindrical interior of the annular sieve element 33 and through the openings of the annular sieve element 33 in the radial direction into the annular mixing chamber 28a. From the annular mixing chamber 28a, the operating medium can flow further against the flow direction of the test object circuit PK through the throttling point 29 into the second annular mixing chamber 28b. From the second annular mixing chamber 28b, the operating medium can, substantially in the opposite direction as in the first mixing chamber 28a, initially flow radially through the openings in the sieve element 33 into the interior of the sieve element 33 and then in the axial direction to the conditioning unit return connection 27b, as indicated by the arrows in FIG. 4. At the same time, during the described flow of the operating medium of the conditioning circuit KK, the operating medium of the test object circuit PK can flow substantially in the opposite direction through the mixing region 28, as indicated by the corresponding arrows.

Figures 5, 6, 7:
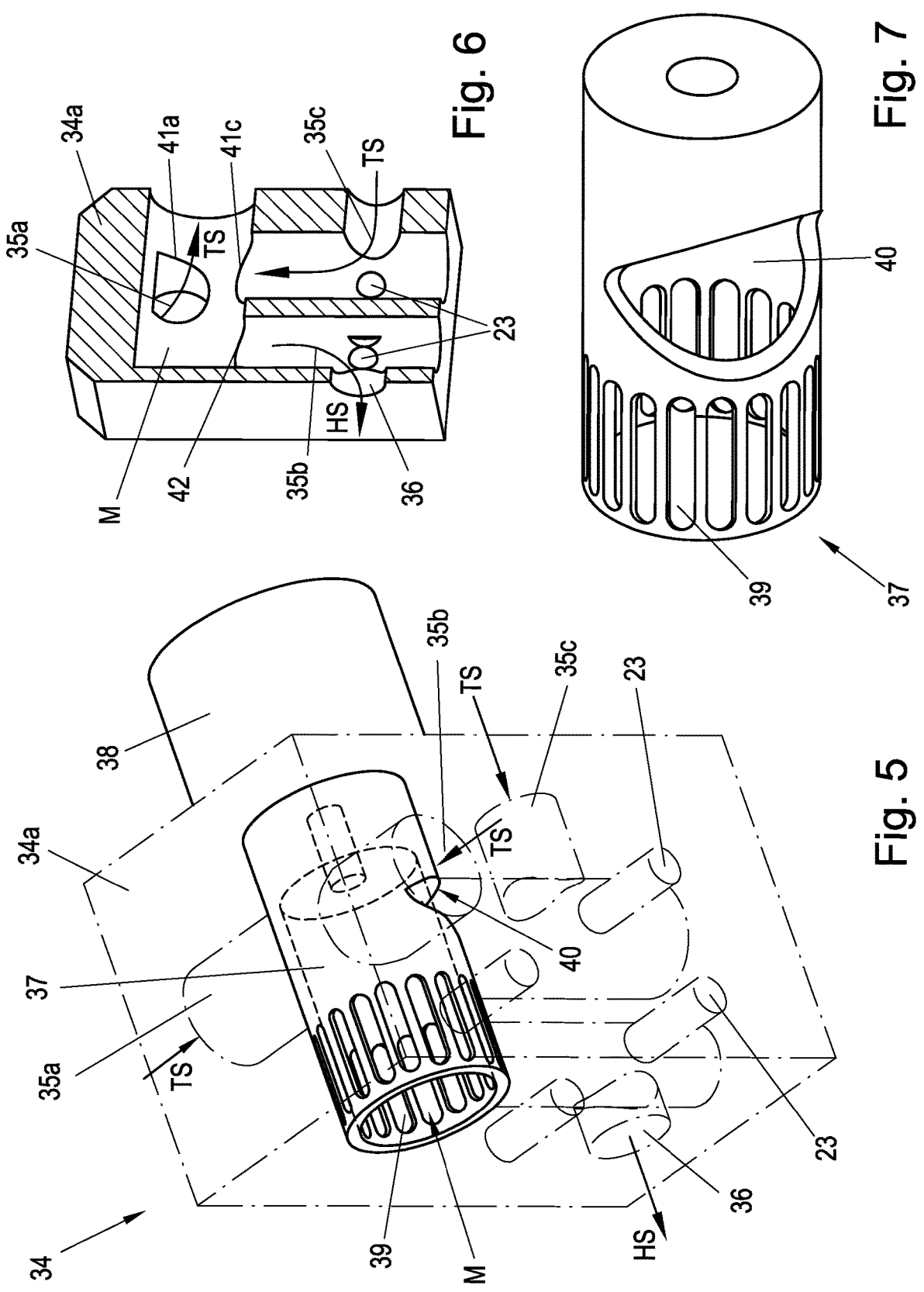
FIG. 5 shows a valve unit according to the invention in an advantageous embodiment.
FIG. 6 is a sectional view of a valve housing of the valve unit.
FIG. 7 shows a mixing element of the valve unit.

Finally, FIG. 5 shows a valve unit 34 for use in the conditioning unit 2 in an advantageous embodiment. FIG. 6 is a sectional view of the valve housing 34a of the valve unit 34 from FIG. 5. FIG. 7 shows a mixing element 37 of the valve unit 34 from FIG. 5. As already described, the valve unit 34 can be used for distributing a main fluid flow HS of a (liquid or gaseous) operating medium to at least two partial fluid flows TS and/or for mixing at least two partial fluid flows of an operating medium or several different operating media to form a main fluid flow HS. The valve unit 34 can therefore advantageously be used, for example, in the conditioning unit 2 shown in FIG. 1b in order to combine the three partial flow lines 7a-7c to form a conditioning collecting line KSL. The valve unit 34 could additionally or alternatively also be used in the conditioning unit 2 at the junction 8 in order to distribute the main flow line 6 into the three partial flow lines 7a-7c. Independently of the conditioning unit 2, however, the valve unit 34 could also be provided for other purposes, for example, in order to generate a mixture of different gases in the main fluid flow HS, which are supplied to the valve unit 34 via the partial fluid flows TS. For example, a synthesis gas could be generated from oxygen $O_2$, nitrogen $N_2$ and carbon dioxide $CO_2$.

The valve unit 34 or the valve housing 34a has at least one main fluid flow connection 36 for the main fluid flow HS and at least one partial fluid flow connection 35a-35c per each part fluid flow TS which communicate fluidically via a mixing chamber M provided in the valve unit 34. If the valve unit according to FIG. 1b is used for mixing the partial fluid flows TS of the partial flow lines 7a-7c, the first partial flow line 7a can, for example, be connected to one of the first partial fluid flow connection 35a, the second partial flow line 7b to the second partial fluid flow connection 35b and the third partial flow line 7c to the third partial fluid flow connection 35c. The conditioning unit collecting line KSL can be connected to the main fluid flow connection 36. In the mixing chamber M, a movable mixing element 37 is provided for controlling the flow rate, which mixing element can be driven by a drive unit 38. Depending on the position of the mixing element 37, a certain mixing ratio of the partial fluid flows can be set.

In the example shown, the mixing element 37 is designed, for example, as a rotatable rotor and the drive unit 38 is designed as an electrically operable actuator, as can be seen in FIG. 5. The drive unit 38 can, for example, be controlled by a suitable control unit in order to mix the partial fluid flows TS with a certain mixing ratio (or to distribute them in a certain ratio). In the example according to FIG. 1b, the valve unit 34 can, for example, be controlled by the conditioning unit control unit 20 with a specific control input variable X_STELL in order to set a mixing ratio of the operating medium from the partial flow lines 7a-7c, so that the desired setpoint temperature T_SOLL is achieved in the test object circuit PK.

As can be seen in FIG. 6 and FIG. 7, the mixing chamber M can be, for example, at least partially cylindrical and the mixing element 37 or the rotor can have, for example, a hollow cylinder which is rotatable in the mixing chamber M (see FIG. 5). A control opening 40, which connects the outer circumferential surface of the hollow cylinder to the inner circumferential surface, is preferably provided on the outer circumferential surface of the hollow cylinder. The control opening 40 can be, for example, a cylindrical bore, but can also have a different shape. In the example shown, the control opening 40 is designed, for example, as a type of notch. The control opening 40 extends in the circumferential direction over a predefined region, which substantially depends on the structural design of the valve unit 34, in particular on the relative arrangement of the arrangement of the inlet openings 41*a* to 41*c* of the partial fluid flow connections 35*a*-35*c* into the mixing space M, wherein only the inlet openings 41*a*, 41*c* can be seen in FIG. 6. For example, the control opening 40 can extend over 90-180° in the circumferential direction. In the axial direction, the length of the control opening 40 preferably corresponds to the length of the inlet openings of the partial fluid flow connections 35*a*-35*c*. By rotating the rotor or hollow cylinder by means of the drive unit 38, the control opening 40 can be brought at least partially into correspondence with at least one inlet opening 41*a*-41*c* of the partial fluid flow connections 35*a*-35*c* opening into the mixing space M. When the valve unit 34 is used as a mixing valve (as in FIG. 1*b*), a certain mixing ratio of the partial fluid flows TS of the operating medium (or of the different operating media) in the main fluid flow HS can thereby be set.

In the example shown according to FIG. 5, the rotor can, for example, preferably be continuously rotated between a first position in which the control opening 40 communicates exclusively with the inlet opening 41*a* of the first partial fluid flow connection 35*a*, a second position, in which the control opening 40 communicates exclusively with the inlet opening 41*b* of the second partial fluid flow connection 35*b* and a third position (vertically downward), in which the control opening 40 communicates exclusively with the inlet opening 41*c* of the third partial fluid flow connection 35*c*. In the first position, the inlet openings 41*b*, 41*c* of the second and third partial fluid flow connections 35*b*, 35*c* are closed so that 100% of the flow can flow through the first partial fluid flow connection 35*a*. In the second position, the inlet openings 41*a*, 41*c* of the first and third partial fluid flow connections 35*a*, 35*c* are closed so that 100% of the flow flows through the second partial fluid flow connection 35*b*, and in the third position, the inlet openings 41*a*, 41*b* of the first and second partial fluid flow connections 35*a*, 35*b* are closed so that 100% of the flow can flow through the third partial fluid flow connection 35*c*. In the case of a position of the control opening 40 between the first and third positions, the first partial fluid flow and the third part fluid flow are mixed in a certain ratio. In the case of a position of the control opening 40 between the second and third positions, the second partial fluid flow and the third part fluid flow are mixed in a certain ratio. The respective mixing ratio depends substantially on the size and geometry of the control opening 40 and on the size and geometry of the inlet openings 41*a*-41*c* of the partial fluid flow connections 35*a*-35*c*.

At least one turbulence recess 39, which connects the outer circumferential surface of the hollow cylinder with the inner circumferential surface, can preferably also be provided on the outer circumferential surface of the hollow cylinder. Preferably, as shown in FIG. 5 and FIG. 7, several turbulence recesses 39 are provided on the hollow cylinder in the circumferential direction. The turbulence recesses 39 are arranged in the axial direction in a section of the hollow cylinder which lies in a region of an opening 42 of the main fluid flow connection 36 in mixing space M. A turbulence in the flow can thereby be generated, whereby improved mixing of the partial fluid flows TS can be achieved. In the mixing of partial fluid flows TS with different temperatures, this can be advantageous, for example, in order to enable the most accurate possible temperature of the mixture in the main fluid flow HS directly at the valve unit 34, for example with the temperature sensor 23 indicated in FIG. 5. As indicated, further temperature sensors 23 can of course also be provided on the valve unit 34, for example a temperature sensor 23 per part fluid flow connection 35*a*-35*c*. In order to further improve the mixing of the partial fluid flows TS, the recesses 39 can be designed, for example, as elongated holes, the main axes of which run, for example, parallel to the axis of the hollow cylinder.

Of course, however, the illustrated valve unit 34 is only to be understood as an example and other embodiments would of course also be conceivable. The mixing space M and the mixing element 37 do not have to be cylindrical, for example, but could also have a different shape. Depending on the structural design of the valve unit 34, in particular of the mixing element 37, of the mixing chamber M and of the position, size and geometry of the control opening 40, the mixing behavior of the valve unit 34 can be adapted to certain boundary conditions.

The invention claimed is:

1. A conditioning unit for a conditioning system of a test bench for conditioning an operating medium of a test object circuit (PK) of a test object (P) mounted on the test bench to a predefined setpoint temperature (T_SOLL), wherein at least one mixing unit supply connection and at least one mixing unit outlet connection are provided on the conditioning unit for connecting the conditioning unit to a mixing unit which is fluidically integrated into the test object circuit (PK), wherein the at least one mixing unit supply connection and the at least one mixing unit outlet connection are fluidically connected within the conditioning unit to form a part of a conditioning circuit (KK) for the operating medium, wherein a main flow line of the conditioning circuit (KK) connected to the at least one mixing unit supply connection is divided in the conditioning unit into at least two partial flow lines, wherein each partial flow line is connected with the at least one mixing unit outlet connection, wherein the operating medium is able to be conditioned in a partial flow line to a predefined conditioning temperature (T1, T2), and the at least one further partial flow line is able to be flowed through by unconditioned operating medium having a relatively higher or lower neutral temperature (T3) compared to the conditioning temperature (T1, T2), wherein a flow rate of the operating medium in the at least two partial flow lines is able to be adjusted as a function of the predefined setpoint temperature (T_SOLL) in the test object circuit (PK).

2. The conditioning unit according to claim 1, wherein the main flow line is divided into at least three partial flow lines, wherein each partial flow line is connected to the at least one mixing unit outlet connection, wherein the operating medium is configured to be conditioned in a first partial flow line to a first conditioning temperature (T1), is configured to be conditioned in a second partial flow line to a second temperature (T2), and a third partial flow line is configured to be flowed through by unconditioned operating medium having a neutral temperature (T3) lying between the first and second conditioning temperature (T1, T2).

3. The conditioning unit according to claim 1, wherein at least one temperature control unit, preferably designed as a heat exchanger, is provided in the conditioning unit in at least one partial flow line in order to condition the operating medium to the respective conditioning temperature (T1, T2).

4. The conditioning unit according to claim 3, wherein at least one heat source supply connection and at least one heat source return connection for connecting a heat source are provided on the conditioning unit, said heat source connections being fluidically connected to a heat exchanger arranged in the partial flow line provided for conditioning the operating medium to the conditioning temperature (T1) that is higher relative to the neutral temperature (T3) in order to form a part of a heat source supply circuit (VK1) and/or that at least one heat sink supply connection and at least one heat sink return connection for connecting a heat sink are provided on the conditioning unit, said heat sink connections are fluidically connected to a heat exchanger arranged in the partial flow line provided for conditioning the operating medium to the lower conditioning temperature (T2) compared to the neutral temperature (T3) in order to form a part of a heat sink supply circuit (VK2).

5. The conditioning unit according to claim 1, wherein at least one conditioning unit control unit for controlling at least the flow rate of the operating medium in the at least two partial flow lines is provided in the conditioning unit or in that the conditioning unit can be connected to a test bench control unit via a test bench interface (S) for controlling at least the flow rate of the operating medium in the at least two partial flow lines.

6. The conditioning unit according to claim 1, wherein a pressure control unit is provided in the at least one partial flow line in which the operating medium is conditioned to the respective conditioning temperature (T1, T2) and that a check valve is provided in the at least one further partial flow line through which unconditioned operating medium can flow, wherein the at least one pressure control unit can be controlled by at least one control unit in order to adjust the flow rate in the at least two partial flow lines.

7. The conditioning unit according to claim 1, wherein a first measuring orifice with a differential pressure sensor for measuring a differential pressure ($\Delta$p1) over the first measuring orifice or a flow measuring unit is provided in the main flow line and that a second measuring orifice with a differential pressure sensor for measuring a differential pressure ($\Delta$p2) over the second measuring orifice or a flow measuring unit is provided in the at least one further partial flow line through which unconditioned operating medium can flow.

\* \* \* \* \*